US011236715B2

(12) United States Patent
Völker et al.

(10) Patent No.: US 11,236,715 B2
(45) Date of Patent: Feb. 1, 2022

(54) FUEL-CONVEYING SYSTEM FOR USE IN A VEHICLE

(71) Applicant: Vitesco Technologies GmbH, Hannover (DE)

(72) Inventors: Marc Völker, Magdeburg (DE); Andreas Sausner, Eschborn (DE)

(73) Assignee: Vitesco Technologies GmbH, Hannover (DE)

( * ) Notice: Subject to any disclaimer, the term of this patent is extended or adjusted under 35 U.S.C. 154(b) by 67 days.

(21) Appl. No.: 16/606,882

(22) PCT Filed: Apr. 13, 2018

(86) PCT No.: PCT/EP2018/059573
§ 371 (c)(1),
(2) Date: Oct. 21, 2019

(87) PCT Pub. No.: WO2018/197238
PCT Pub. Date: Nov. 1, 2018

(65) Prior Publication Data
US 2021/0102518 A1    Apr. 8, 2021

(30) Foreign Application Priority Data
Apr. 27, 2017   (DE) .................... 10 2017 207 106.0

(51) Int. Cl.
*F02M 37/18*    (2006.01)
*B60K 15/03*    (2006.01)
(Continued)

(52) U.S. Cl.
CPC ............. *F02M 37/18* (2013.01); *B60K 15/03* (2013.01); *B60K 15/077* (2013.01); *F02M 37/02* (2013.01);
(Continued)

(58) Field of Classification Search
CPC ........ F02M 37/18; F02M 37/02; F02M 37/04; F02M 37/08; F02M 37/10; F02M 37/025; B60K 15/03; B60K 15/077
(Continued)

(56) References Cited

U.S. PATENT DOCUMENTS 6,276,342 B1    8/2001  Sinz et al.
2003/0159681 A1*  8/2003  Schueler .............. F02M 37/025
                                                    123/514
(Continued)

FOREIGN PATENT DOCUMENTS

CN      102388215    3/2012
DE      199 32 356   2/2000
(Continued)

OTHER PUBLICATIONS

International Search Report issued in corresponding PCT Application PCT/EP2018/059573.
(Continued)

*Primary Examiner* — Mahmoud Gimie
(74) *Attorney, Agent, or Firm* — Cozen O'Connor

(57) ABSTRACT

A fuel-conveying system includes: a primary fuel pump, configured to supply fuel to an internal combustion engine of a vehicle, at a fuel pressure; a suction jet pump configured to convey fuel from a first region of a fuel tank of the vehicle to a second region of the fuel tank, the at least one suction jet pump having a nozzle; and a secondary fuel pump, decoupled from the primary fuel pump and configured to: supply, as required, the suction jet pump with a fuel jet, and set, independently of the primary fuel pump, a pressure of the fuel jet before the nozzle of the suction jet pump.

13 Claims, 1 Drawing Sheet

(51) Int. Cl.
*B60K 15/077* (2006.01)
*F02M 37/02* (2006.01)
*F02M 37/04* (2006.01)
*F02M 37/08* (2006.01)
*F02M 37/10* (2006.01)

(52) U.S. Cl.
CPC ............ *F02M 37/04* (2013.01); *F02M 37/08* (2013.01); *F02M 37/10* (2013.01)

(58) Field of Classification Search
USPC .................................................. 123/497, 509
See application file for complete search history.

(56) References Cited

U.S. PATENT DOCUMENTS

| | | | | |
|---|---|---|---|---|
| 2008/0142097 | A1* | 6/2008 | Rumpf | F02M 37/106 137/565.23 |
| 2008/0236550 | A1* | 10/2008 | Kobayashi | F02M 37/0052 123/514 |
| 2011/0146627 | A1* | 6/2011 | Oohashi | F02M 37/0029 123/497 |
| 2013/0248027 | A1* | 9/2013 | Gutscher | F02M 37/025 137/565.11 |
| 2015/0059709 | A1* | 3/2015 | Oohashi | F02M 37/0088 123/509 |
| 2017/0051701 | A1* | 2/2017 | Pursifull | F02D 19/0615 |

FOREIGN PATENT DOCUMENTS

| | | |
|---|---|---|
| DE | 103 35 698 | 2/2005 |
| DE | 10 2004 007 718 | 10/2005 |
| DE | 10 2005 005 171 | 8/2006 |
| DE | 102005003590 | 8/2006 |
| WO | WO 2006/079401 | 8/2006 |

OTHER PUBLICATIONS

Written Opinion issued in corresponding PCT Application PCT/EP2018/059573.
Office Action issued in corresponding German Application No. 10 2017 207 106.0.
Office Action dated Dec. 3, 2020 issued in Chinese Patent Application No. 201880019348.1.
Office Action dated Oct. 25, 2021 issued in Chinese Patent Application No. 201880019348.1.

* cited by examiner

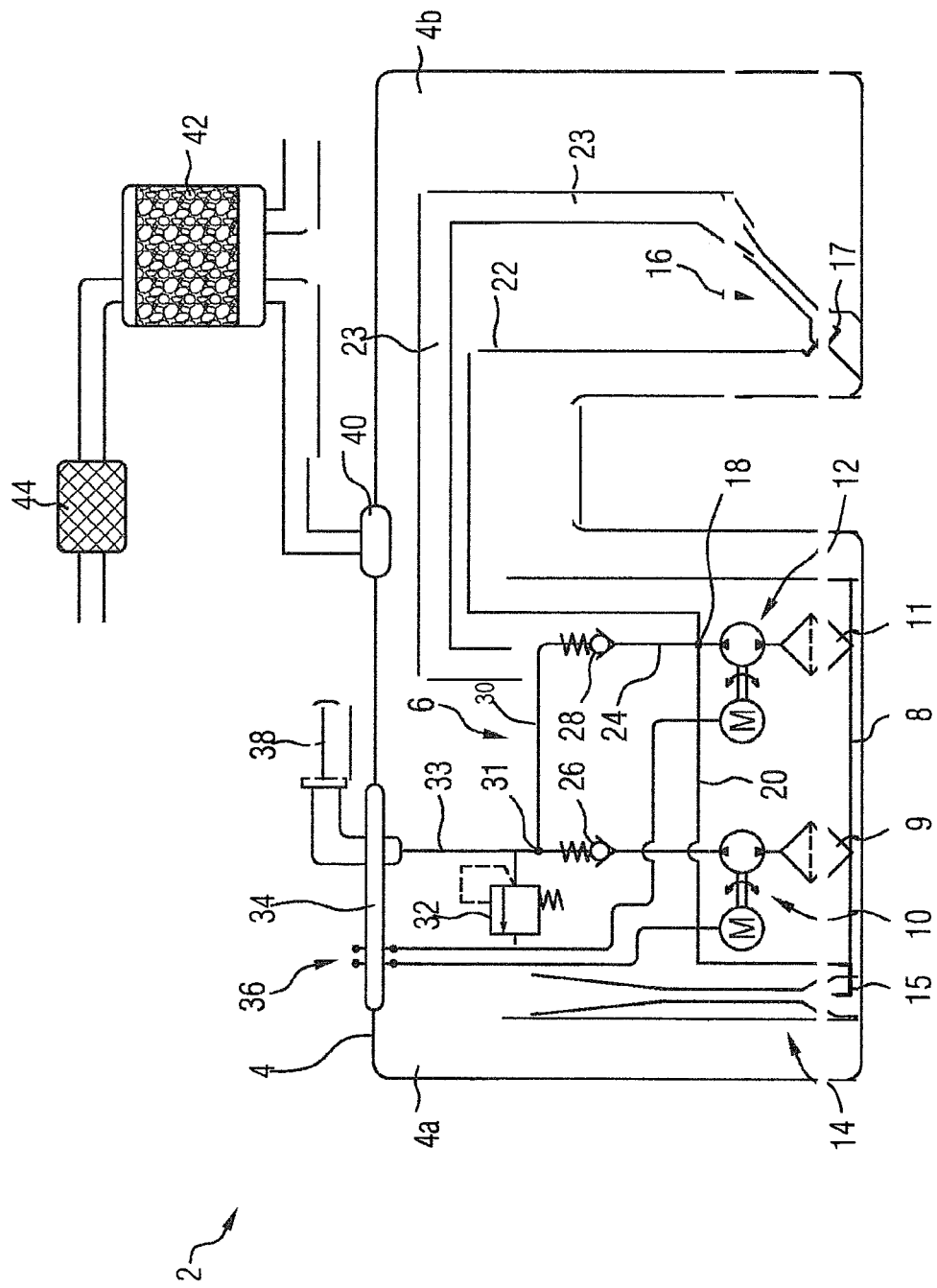

FUEL-CONVEYING SYSTEM FOR USE IN A VEHICLE

CROSS REFERENCE TO RELATED APPLICATIONS

This is a U.S. national stage of International application No. PCT/EP2018/059573, filed on Apr. 13, 2018, which claims priority to German Application No. 10 2017 207 106.0, filed Apr. 27, 2017, the content of each of which is incorporated herein by reference.

BACKGROUND OF THE INVENTION

1. Field of the Invention

The invention relates to a fuel-conveying system for use in a vehicle, to a fuel tank having such a fuel-conveying system, and to a vehicle having such a fuel tank.

2. Description of the Prior Art

Suction jet pumps installed in a fuel supply system of a vehicle are used to convey fuel from one region of a fuel tank to another region of the fuel tank, in which an electric fuel pump is situated. Suction jet pumps are also used to convey condensed fuel out of a ventilation system and to feed said fuel to the fuel pump.

According to the prior art, such suction jet pumps are supplied with a fuel jet by a fuel pump for the purpose of achieving a pump action that primarily serves for the supply of fuel to an internal combustion engine.

In a lower to medium load range of the internal combustion engine, according to the number and design of the suction jet pumps and according to the design of the fuel pump, 50% to 90% of the amount of energy that is provided for the fuel pump is used for the fuel supply to the suction jet pumps. This requires that the fuel pump be dimensioned to be correspondingly stronger and is also accompanied by correspondingly higher energy consumption.

Furthermore, fuel vapor is formed in principle at the outlet of such a suction jet pump and is added to the fuel evaporating, due to temperature, in a fuel tank, and thus contributes to the formation of fuel vapor in the tank. In particular in the case of complex tank geometries requiring a multiplicity of suction jet pumps, a considerable amount of fuel vapor is formed by way of the suction jet pumps, as a result of which the formation of fuel vapor in the tank is increased overall. In principle, it would be possible to tackle the energy and evaporation problems by way of mechanically or electrically activable and deactivable suction jet pumps, these being known as such according to the prior art. However, this leads to more complex and thus more expensive systems.

SUMMARY OF THE INVENTION

It is therefore an object of the invention to contribute to the saving of energy with regard to fuel pumps of this type. A further object of the invention is to reduce the formation of fuel vapor in the fuel tank.

In accordance with an aspect of the invention, a fuel-conveying system is proposed, having:

at least one primary fuel pump, which serves for supplying an internal combustion engine with a fuel, with provision of a fuel pressure, at least one secondary fuel pump, which is decoupled from the primary fuel pump and which serves for supplying at least one suction jet pump with a fuel jet according to requirement and which serves for setting, independently of the primary fuel pump, a pressure of the fuel jet before a nozzle—also referred to as "propellant nozzle"—of the suction jet pump, and at least one suction jet pump, which serves for conveying the fuel from one region of a fuel tank to another region of the fuel tank or a fuel-conveying unit.

The separation or decoupling of the fuel supply to the internal combustion engine from the fuel or propellant flow supply to the at least one suction jet pump leads to a significant saving of energy in that both the primary fuel pump and the secondary fuel pump are able to be configured or dimensioned more favorably according to the use thereof. This also improves the efficiency of such a system in comparison with a system according to the prior art.

Moreover, it is also possible for the fuel jet pressure or propellant pressure before the nozzle or propellant nozzle of the suction jet pump to be set, and in this case reduced, according to requirement independently of the primary fuel pump. This also reduces the formation of fuel vapor at the outlet of the suction jet pump, which is formed in that the fuel or propellant flow at the outlet of the suction jet pump expands from a relatively high pressure level to a relatively low pressure level. As a result of this, it is also the case that the formation of fuel vapor is reduced overall within a fuel tank. This in turn can make possible the use of a relatively small fuel vapor store or activated carbon store of a tank ventilation system and thus contribute to the saving of costs.

The separation or decoupling advantageously allows the at least one primary fuel pump to be powered down to an absolute minimum amount of energy in case of need—that is to say in phases in which an internal combustion engine requires no fuel or at least barely any fuel—especially as the fuel or propellant flow supply to the at least one suction jet pump is ensured by the secondary fuel pump. To illustrate this, mention may be made, for example, of a descent of a vehicle in a parking garage, which descent is associated with a corresponding overrun fuel cutoff of the internal combustion engine.

In comparison with systems known according to the prior art that allow mechanical or electrical activation and deactivation of suction jet pumps in order to tackle both the energy problem and the formation in principle of fuel vapor, the system according to an aspect of the invention not only promotes system robustness but also extends the operating range in which the suction jet pumps can, on account of the settability of the fuel or propellant flow rate, which settability is independent of the primary pump, be operated.

In accordance with an aspect of the invention, the system may comprise two or more fuel pumps, wherein preferably, the at least one primary fuel pump is not assigned a suction jet pump or else is assigned a suction jet pump with a low fuel or propellant flow rate. This promotes the greatest possible saving of energy. The suction jet pumps provided in the system are assigned to at least one or more secondary fuel pumps. In this respect, the assignment of the suction jet pumps is asymmetrical. It is also possible for the assignment of the suction jet pumps to be asymmetrical with respect to multiple secondary fuel pumps.

According to an aspect of the invention, downstream of the secondary fuel pump, provision is made of a check valve, which decouples a hydraulic conveying circuit to which the secondary fuel pump belongs from a conveying path of the primary fuel pump and via which the secondary fuel pump is able to be switched in in a manner supporting the primary fuel pump, in order advantageously, for example in an upper load range of the internal combustion engine, to contribute directly to the fuel supply thereto.

According to a further aspect of the invention, it is advantageously possible here for the primary fuel pump, in comparison with the secondary fuel pump, to be dimensioned to be less powerful and to be configured for a part-load range—for example a lower to medium load range—of the internal combustion engine, wherein, in the full-load range—that is to say in an upper load range up to the full load—of the internal combustion engine, the more powerful secondary fuel pump is able to be switched in via the check valve to the conveying path for the purpose of supporting the primary fuel pump. Such a configuration contributes to the saving of energy and furthermore complements the aspect of the aforementioned asymmetry.

It is furthermore proposed that, downstream of the secondary fuel pump and before the check valve, provision be made of a first line connection point, from which at least one line leads away to the at least one suction jet pump. From the first line connection point it is possible, for example, for a first line to lead away to a first suction jet pump and for a second line to lead away to a second suction jet pump.

It is proposed that the secondary fuel pump support the fuel supply to the internal combustion engine by the primary fuel pump in that a third line leads away from the first line connection point to a second line connection point, which is provided downstream of the primary fuel pump and from which a line—as part of the conveying path—leads away for the purpose of providing the internal combustion engine with a supply.

The at least one suction jet pump may in this case be provided in or on a swirl pot of a fuel-conveying unit. For example, a first suction jet pump may be provided in or on the swirl pot of the fuel-conveying unit in a first region of a fuel tank, whereas a second suction jet pump may be provided in a second region of the fuel tank.

Here, the at least one secondary fuel pump may be arranged in the region of the primary fuel pump, wherein, according to the configuration of the fuel-conveying unit, the secondary fuel pump may be arranged within or outside the swirl pot of the fuel-conveying unit, in which swirl pot the primary fuel pump is preferably provided.

In principle, the system proposed in the context of the present disclosure is independent of a tank geometry. In this respect, the proposed system is suitable for use with both simple and complex tank geometries.

According to a further aspect of the invention, the setting according to requirement of the pressure of the fuel jet before the nozzle of the suction jet pump may be realized in a manner controlled or regulated by the secondary fuel pump. The control or regulation may be realized here through the use of at least one characteristic map, one characteristic curve and/or one fixed value, with an operating point of the suction jet pump being considered. Here, the control or regulation may furthermore be realized on the basis of current, that is to say either a supply current or a reference variable correlated with the current, for example a pressure or a volume flow rate, may be used as a control or regulating variable.

A fuel tank for a vehicle having a fuel-conveying system of the above-described type and a vehicle having such a fuel tank are also proposed.

BRIEF DESCRIPTION OF THE DRAWING

The invention will be discussed in detail below with reference to the single FIGURE. Further advantageous refinements of the invention will emerge from the following description of preferred embodiments. To that end, in the FIGURE:

The FIGURE shows a schematic illustration of a proposed fuel-conveying system.

DETAILED DESCRIPTION OF THE PRESENTLY PREFERRED EMBODIMENTS

The fuel-conveying system 2 comprises a saddle-shaped tank 4 having a first, or in the FIGURE left-hand, tank region 4a and a second, or in the FIGURE right-hand, tank region 4b.

A fuel-conveying unit 6 is arranged in the left-hand tank region 4a and comprises a swirl pot 8 in which both a primary fuel pump 10 and a secondary fuel pump 12 are accommodated. The two fuel pumps 10, 12 in this case each comprise an electric motor and a pump stage that is driven by the electric motor. Here, the filters 9, 11 assigned to the two fuel pumps 10, 12 stand, schematically for the sake of simplicity, for in each case one prefilter and one fine filter for filtering a conveyed fuel. Also arranged in the left-hand tank region 4a, in or on the swirl pot 8, is a first suction jet pump 14, whose inlet, into which a propellant nozzle 15 projects, is arranged in the vicinity of the base of the tank region 4a. The outlet of the first suction jet pump 14 extends into the swirl pot 8.

Arranged in the right-hand sub-region 4b on the other hand is a second suction jet pump 16, whose inlet, into which a propellant nozzle 17 projects, is arranged in the vicinity of the base of the tank region 4b. Extending from the outlet of the second suction jet pump 16 to the swirl pot 8 is a line 23 via which the fuel is conveyed from the tank region 4b to the swirl pot 8 and thereby to the two fuel pumps 10, 12.

Downstream of the secondary fuel pump 12, provision is made of a first line connection point 18, from which a first line 20 leads away to the first suction jet pump 14 and a second line 22 leads away to the second suction jet pump 16. Moreover, a third line 24 leads away from the first line connection point 18 to a first check valve 28, which is arranged downstream of the secondary fuel pump 12 and from which a line 30 leads to a second line connection point 31, which is provided downstream of the primary fuel pump 10. A second check valve 26 is arranged between the primary fuel pump 10 and the second line connection point 31. Consequently, the two fuel pumps 10, 12 are each assigned a separate check valve 26, 28. Maintenance of the fuel pressure downstream of the check valves 26, 28, and thus also of the fuel pressure in a supply line which leads to an internal combustion engine, is realized by way of the check valves 26, 28. The first check valve 28 furthermore decouples the hydraulic conveying circuit to which the secondary fuel pump 12 belongs from the conveying path of the primary fuel pump 10, with the result that the secondary fuel pump 12 is, in a manner supporting the primary fuel pump 10, able to be switched in, for example in a range close to the full load of the internal combustion engine.

According to one embodiment, the primary fuel pump 10 is, in comparison with the secondary fuel pump 12, dimensioned to be less powerful and is configured for a part-load range of the internal combustion engine. Here, in the full-load range of the internal combustion engine, the more powerful secondary fuel pump 12 is able to be switched in via the check valve 28 to the conveying path of the primary fuel pump 10 for the purpose of supporting the primary fuel pump 10. The primary fuel pump 10 can in this case supply the internal combustion engine with a fuel volume flow rate of for example up to 10 l/h. Here, a fuel pressure of approximately 5 to 6 bar can be established in the supply line to the internal combustion engine. On the other hand, a fuel pressure of for example up to 1 bar is sufficient for the operation of the hydraulic conveying circuit by the secondary fuel pump 12 in the state decoupled from the conveying path of the primary fuel pump 10.

A line 33 leads from the second line connection point 31 to a connection piece which is formed on a flange 34 of the fuel-conveying unit 6 and which projects into the interior of the tank 4. A pressure-limiting valve 32 is also arranged downstream of the second line connection point 31.

According to an alternative embodiment, the primary fuel pump 10, which provides the fuel supply and the fuel pressure for the internal combustion engine, may also be assigned a suction jet pump which is supplied with a low fuel or propellant flow rate. From an energetic standpoint, such an embodiment is, in comparison with systems known from the prior art, still better or more favorable.

A connection piece 38 for connection with a supply line leading to the internal combustion engine is formed on that side of the flange 34 facing away from the tank interior. Terminals 36 arranged on the flange 34 and serving for electrical connection of the two fuel pumps 10, 12 are also illustrated.

Illustrated above the saddle-shaped tank 4 is a tank ventilation system attached to the tank 4 via a connection point 40. A line leads from the connection point 40 to an activated carbon filter 42 that temporarily stores fuel vapors from the tank 4, the fuel vapors being fed to the internal combustion engine upon corresponding activation of a ventilation valve 44.

Although exemplary embodiments are discussed in the above description, it should be noted that numerous modifications are possible. Furthermore, it should be noted that the exemplary embodiments are merely examples which are not intended to limit the scope of protection, applications and structure in any way. Rather, the above description will provide a person skilled in the art with a guideline for implementing at least one exemplary embodiment, wherein various modifications, in particular with regard to the function and arrangement of the described constituent parts, may be made without departing from the scope of protection as defined by the claims and by these equivalent combinations of features.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A fuel-conveying system for use in a vehicle having an internal combustion engine and a fuel tank (4) having a first region (4a) and a second region (4b), the fuel-conveying system comprising:
    at least one primary fuel pump (10), configured to supply fuel to the internal combustion engine, at a fuel pressure;
    at least one suction jet pump (14, 16) configured to convey the fuel from the first region (4a) of the fuel tank (4) to the second region (4b) of the fuel tank (4), the at least one suction jet pump (14, 16) having a nozzle (15, 17);
    at least one secondary fuel pump (12), decoupled from the at least one primary fuel pump (10) and configured to:
        supply, as required, the at least one suction jet pump (14, 16) with a fuel jet, and
        set, independently of the at least one primary fuel pump (10), a pressure of the fuel jet before the nozzle (15, 17) of the at least one suction jet pump (14, 16); and
    a check valve (28), arranged downstream of the at least one secondary fuel pump (12), the check valve (28) being configured to decouple a hydraulic conveying circuit of the at least one secondary fuel pump (12) from a conveying path of the at least one primary fuel pump (10) and via which the at least one secondary fuel pump (12) is switchable in, in a manner supporting the at least one primary fuel pump (10),
    wherein the at least one primary fuel pump (10) is, in comparison with the at least one secondary fuel pump (12), dimensioned so as to be less powerful than the at least one secondary fuel pump (12) and is configured for a part-load range of the internal combustion engine, wherein, in the full-load range of the internal combustion engine, the more powerful at least one secondary fuel pump (12) is switchable in via the check valve (28) to the conveying path to provide support to the less powerful at least one primary fuel pump (10).

2. The system as claimed in claim 1, further comprising, downstream of the at least one secondary fuel pump (12) and before the check valve (28), a first line connection point (18), from which at least one line (20, 22) leads away to the at least one suction jet pump (14, 16).

3. The system as claimed in claim 2, wherein the at least one suction jet pump (14, 16) comprises a first suction jet pump (14) and a second suction jet pump (16), and, from the first line connection point (18), a first line (20) leads away to the first suction jet pump (14) and a second line (22) leads away to the second suction jet pump (16).

4. The system as claimed in claim 3, wherein the at least one secondary fuel pump (12) supports the fuel supply to the internal combustion engine by the at least one primary fuel pump (10) in that a third line (24, 30) leads away from the first line connection point (18) to a second line connection point (31), which is provided downstream of the at least one primary fuel pump (10) and from which a line (33) leads away for the purpose of providing the internal combustion engine with a supply.

5. The system as claimed in claim 3, wherein the first suction jet pump (14) is arranged in or on a swirl pot (8) of a fuel-conveying unit (6).

6. The system as claimed in one of claim 5, wherein the first suction jet pump (14) is provided in or on the swirl pot (8) of the fuel-conveying unit (6) in the first region (4a) of a fuel tank (4), whereas the second suction jet pump (16) is provided in the second region (4b) of the fuel tank (4).

7. The system as claimed in claim 1, wherein the at least one secondary fuel pump (12) is arranged proximate the at least one primary fuel pump (10).

8. The system as claimed in claim 1, wherein the setting of the pressure of the fuel jet before the nozzle (15, 17) of the at least one suction jet pump (14, 16) is controlled or regulated by the at least one secondary fuel pump (12).

9. The system as claimed in claim 8, wherein the control or regulation is realized using at least one characteristic map, one characteristic curve and/or one fixed value, taking into account an operating point of the suction jet pump being controlled or regulated.

10. The system as claimed in claim 9, wherein the control or regulation is realized on the basis of current.

11. The fuel tank for the vehicle, the fuel tank having the fuel-conveying system (2) as claimed in claim 1.

12. The vehicle having the fuel tank as claimed in claim 11.

13. A fuel-conveying system for use in a vehicle having an internal combustion engine and a fuel tank (4) having a first region (4a) and a second region (4b), the fuel-conveying system comprising:

at least one primary fuel pump (10), configured to supply fuel to the internal combustion engine, at a fuel pressure;

at least one first suction jet pump (14, 16) configured to convey the fuel from the first region (4a) of the fuel tank (4) to the second region (4b) of the fuel tank (4), the at least one suction jet pump (14, 16) having a nozzle (15, 17);

at least one second suction jet pump configured to be coupled to the at least one primary fuel pump (10);

at least one secondary fuel pump (12), decoupled from the at least one primary fuel pump (10) and configured to:
supply, as required, the at least one first suction jet pump (14, 16) with a first fuel jet, and
set, independently of the at least one primary fuel pump (10), a pressure of the first fuel jet before the nozzle (15, 17) of the at least one first suction jet pump (14, 16); and a check valve (28), arranged downstream of the at least one secondary fuel pump (12), the check valve (28) being configured to decouple a hydraulic conveying circuit of the at least one secondary fuel pump (12) from a conveying path of the at least one primary fuel pump (10) and via which the at least one secondary fuel pump (12) is switchable in, in a manner supporting the at least one primary fuel pump (10), wherein the at least one primary fuel pump (10) is configured to supply, as required, the at least one second suction jet pump with a second fuel jet having a lower fuel or propellant flow rate than is supplied to the first suction jet pump.

* * * * *